(12) United States Patent
Kanai et al.

(10) Patent No.: US 6,341,335 B1
(45) Date of Patent: Jan. 22, 2002

(54) INFORMATION PROCESSING SYSTEM FOR READ AHEAD BUFFER MEMORY EQUIPPED WITH REGISTER AND MEMORY CONTROLLER

(75) Inventors: Hiroki Kanai, Machida; Yasuo Inoue, Odawara; Yoshifumi Takamoto, Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/181,676

(22) Filed: Oct. 29, 1998

(30) Foreign Application Priority Data

Oct. 29, 1997 (JP) .............................. 9-296653

(51) Int. Cl.[7] .......................... G06F 12/00; G06F 12/14; G06F 13/38; G06F 9/30; G06F 13/40
(52) U.S. Cl. ........................ 711/137; 711/171; 712/207; 710/127; 710/128
(58) Field of Search ................................ 711/137, 105, 711/171, 150, 5; 710/126, 127, 128, 118; 712/207, 237, 238, 239

(56) References Cited

U.S. PATENT DOCUMENTS

| | | | |
|---|---|---|---|
| 5,257,359 A | 10/1993 | Blasco et al. | |
| 5,357,618 A | * 10/1994 | Mirza | 395/400 |
| 5,367,657 A | * 11/1994 | Khare et al. | 395/425 |
| 5,752,272 A | * 5/1998 | Tanabe | 711/171 |
| 5,761,464 A | * 6/1998 | Hopkins | 395/310 |
| 5,778,422 A | 7/1998 | Genduso et al. | |
| 5,893,917 A | * 4/1999 | Derr | 711/105 |
| 5,960,450 A | * 8/1999 | Lang et al. | 711/5 |
| 5,974,493 A | * 10/1999 | Okumura et al. | 710/127 |
| 6,018,793 A | * 1/2000 | Rao | 711/150 |
| 6,031,783 A | * 2/2000 | Proebsting | 365/230.03 |
| 6,073,215 A | * 6/2000 | Synder | 711/137 |

* cited by examiner

*Primary Examiner*—Do Hyun Yoo
*Assistant Examiner*—Kimberly McLean
(74) *Attorney, Agent, or Firm*—Antonelli, Terry, Stout & Kraus, LLP

(57) ABSTRACT

An information processing system which reduces an access latency from a memory read request of a processor to a response thereto and also prevents reduction of the effective performance of a system bus caused by an increase in the access latency. In the information processing system, a memory controller is connected with the processor via a first bus and connected with a memory via a second bus, and a buffer memory is provided in the memory controller. The control circuit is controlled, before a memory access from the processor is carried out, to estimate an address to be possibly next accessed on the basis of addresses accessed in the past and to prefetch into the buffer memory, data stored in an address area continuous to the address and having a data size of twice or more an access unit of the processor.

2 Claims, 13 Drawing Sheets

INFORMATION PROCESSING SYSTEM FOR READ AHEAD BUFFER MEMORY EQUIPPED WITH REGISTER AND MEMORY CONTROLLER

BACKGROUND OF THE INVENTION

The present invention relates to an information processing system which comprises a processor for performing arithmetic operation, a memory and a memory controller for performing control over the memory and more particularly, to a prefetch function in an information processing system which uses an embedded processor as a processor.

FIG. 13 shows an arrangement of a general information processing system as a prior art. A processor 1 and a memory controller 2 are connected by a system bus 110, the memory controller 2 and a memory 3 are connected by a memory bus 111, and the memory controller 2 and another system are connected by an IO bus (not shown). The processor 1 of the present system includes an on-chip cache (which will be referred to as the L1 cache, hereinafter) 12, and an L2 cache 14 connected to the system bus 110. The memory controller 2 performs connection control not only over the memory 3 and L2 cache 14 but also over the other system. The operation of the processor 1 of reading an instruction code (which operation will be referred to as fetch, hereinafter) is summarized as follows. The processor 1 issues a memory access request to the memory controller 2 via the instruction processing part 11 and system bus 110. The memory controller 2, in response to the request, reads an instruction code from the L2 cache 14 or memory 3 and transmits it to the processor 1. An access size between the processor 1 and memory 3 is influenced by the L1 cache 12 so that the reading of the code from the memory 3 is carried out on every line size basis as the management unit of the L1 cache 12. Most processors are each equipped usually with, in addition to an L1 cache, an L2 cache provided outside the processor core as a relatively high-speed memory. The word 'cache' as used herein refers to a memory which stores therein an instruction code once accessed by a memory to realize a high-speed access to the same code in the case of an occurrence of the re-access to the same code. In order to perform arithmetic operation, the processor also makes access not only to such an instruction code but also to various sorts of data including operands and to external registers. Even these data is stored in an cache in some cases. Such a technique is already implemented in many systems including a personal computer as a typical example.

SUMMARY OF THE INVENTION

In an information processing system, in addition to the arithmetic operation performance of a processor, the reading performance of an instruction code from a memory to the processor is also important. A delay from the access request of the processor to the acceptance of the data thereof is known as an access latency. In these years, the core performance of the processor has been remarkably improved, but an improvement in the supply capability of the instruction code from the access memory is still insufficient. When the access latency becomes unnegligible due to a performance difference between the two, the operation of the processor stalls, which disadvantageously results in that the processor cannot fully exhibit the performances and thus the memory system becomes a bottleneck in the system. Such an access latency problem occurs not only for the instruction fetch but also for data or register operands.

Conventional methods for improving an access latency include first to fourth methods which follow.

The first improvement method is to improve the performance of a system bus. In order to improve the performance of the system bus, it becomes necessary to extend a bus width and improve an operational frequency. However, the improvement is difficult because of the following problems (1) using too many pins of devices to connect the system bus, and (2) a noise problem, such as crosstalk.

The second improvement method is to speed up the memory. For the speed-up of the memory, it is considered to speed up the operation of the memory per se and also to use a cache as the memory. However, such a high-speed memory as a high-speed SRAM or a processor-exclusive memory is expensive, which undesirably involves an increase in the cost of the entire system. Meanwhile the cache has problems based on its principle as follows. That is, the cache is effective after once accessed and is highly useful when repetitively accessed. In particular, a program to be executed on a so-called embedded processor tends to have a low locality of references, the re-use frequency of an instruction code is low and thus the cache memory cannot work effectively. This causes the instruction code to have to be read out directly from the memory, for which reason this method cannot make the most of the high-speed feature of the cache. Further, such a high-speed cache memory used as a high-speed SRAM or a processor-exclusive memory is expensive. Though the price/performance ratio of the memory is improved, the employment of the latest high-speed memory involves high costs. An increasingly large capacity of memory has been demanded by the system in recent years. Thus the cost increase becomes a serious problem.

The third improvement method is considered to employ a so-called harvard architecture of access separation between the instruction code and data. In other words, a bus for exclusive use in the instruction code access and another bus for exclusive use of the data access are provided in the processor. The harvard architecture can be employed for the L1 cache, but the employment thereof for the system bus involves a problem of using many pins of devices to connect the system bus because it requires mounting of 2 channel buses.

The fourth improvement method is considered, prior to issuance of a fetch request of an instruction code from an arithmetic operation part in a processor, to previously read the instruction code (prefetch) from a memory in a memory within the processor. Details of the prefetch is disclosed in U.S. Pat. No. 5,257,359. Disclosed in the publication is that an instruction decoder in the arithmetic operation part decodes and analyzes a required instruction code to thereby predict an instruction code to be next accessed and to previously read the instruction code. In general, the prefetch is effective when the instruction supply ability or rate of the processor is higher than an instruction execution rate thereof. However, since the prefetch within the processor is carried out through the system bus, the system bus creates a bottleneck. Further, since the prefetch within the processor is carried out through the system bus, this prefetch raises a contention with such another external access as an operand access, which disables expectation of its sufficient effect.

The effect of the prefetch generally depends on the characteristics of an instruction code to be executed. The inventor of the present application has paid attention to the fact that an embedding program to be executed on an embedded type processor contains many flows of collectively processing an access to operand data placed on a peripheral register or memory and a comparison judgement and on the basis of its judgement result, selecting the next processing, that is, the program contains lots of syntax "IF~THEN~ELSE~", for instance, in C language. In the collective processing of operand data access and comparison judgement, the program is processed highly sequentially and tends to have a low locality of references as already mentioned above. In the processing of selecting the next processing based on the judgement result, on the other hand, a branch takes place typically on each processing unit basis of several to several tens of steps. That is, the embedding program is featured in (1) a highly sequential processing property and (2) many branches. In the case of such a program code, the access latency can be reduced by prefetching an instruction code of several to several tens of steps preceding the instruction code currently being executed. However, since the within-processor prefetch of the instruction code of several to several tens of steps ahead as mentioned in the above third improvement method causes the system bus to be occupied by the prefetch memory access, an operand access is forced to wait on the system bus. This disadvantageously leads to the fact that the processor stalls.

It is therefore an object of the present invention to reduce an access latency from the issuance of a memory read request by a processor to a response thereto. Another object of the invention is to prevent reduction of an effective system bus performance caused by an increase in the access latency.

In accordance with an aspect of the present invention, in order to attain the above object, there is provided an information processing system in which a memory controller is connected with the processor via a first bus and connected with a memory via a second bus, and a buffer memory is provided in the memory controller. The control circuit is controlled, before a memory access from the processor is carried out, to estimate an address to be possibly next accessed on the basis of addresses accessed in the past and to prefetch into the buffer memory, data stored in an address area continuous to the address and having a data size of twice or more an access unit of the processor.

In another information processing system, a memory controller is connected with the processor via a first bus and connected with a memory via a second bus, a prefetching buffer memory is provided in the memory controller, the memory and controller are mounted on an identical chip, the operational frequency of the second bus is set to be higher than that of the first bus.

In a further information processing system, a memory controller is connected with the processor via a first bus and connected with a memory via a second bus, a prefetching buffer memory is provided in the memory controller, the memory and controller are mounted on an identical chip, the bus width of the second bus is set to be larger than that of the first bus.

Other means for attaining the above objects as disclosed in the present application will be obvious from the explanation in connection with embodiments which follow.

DESCRIPTION OF THE PREFERRED EMBODIMENTS

An embodiment of the present invention will be explained with reference to the accompanying drawings.

First, explanation will be briefly made as to processor access. A processor accesses a memory via a system bus and a memory controller. In this case, the processor performs all its external accesses to an instruction code, data, an external register, etc. via the system bus. Accordingly, the processor can access only one of the above memory access areas at a time. Therefore, a bus connected between the memory controller and the memory is separated from the system bus to increase the availability of the system bus.

Figure 1:
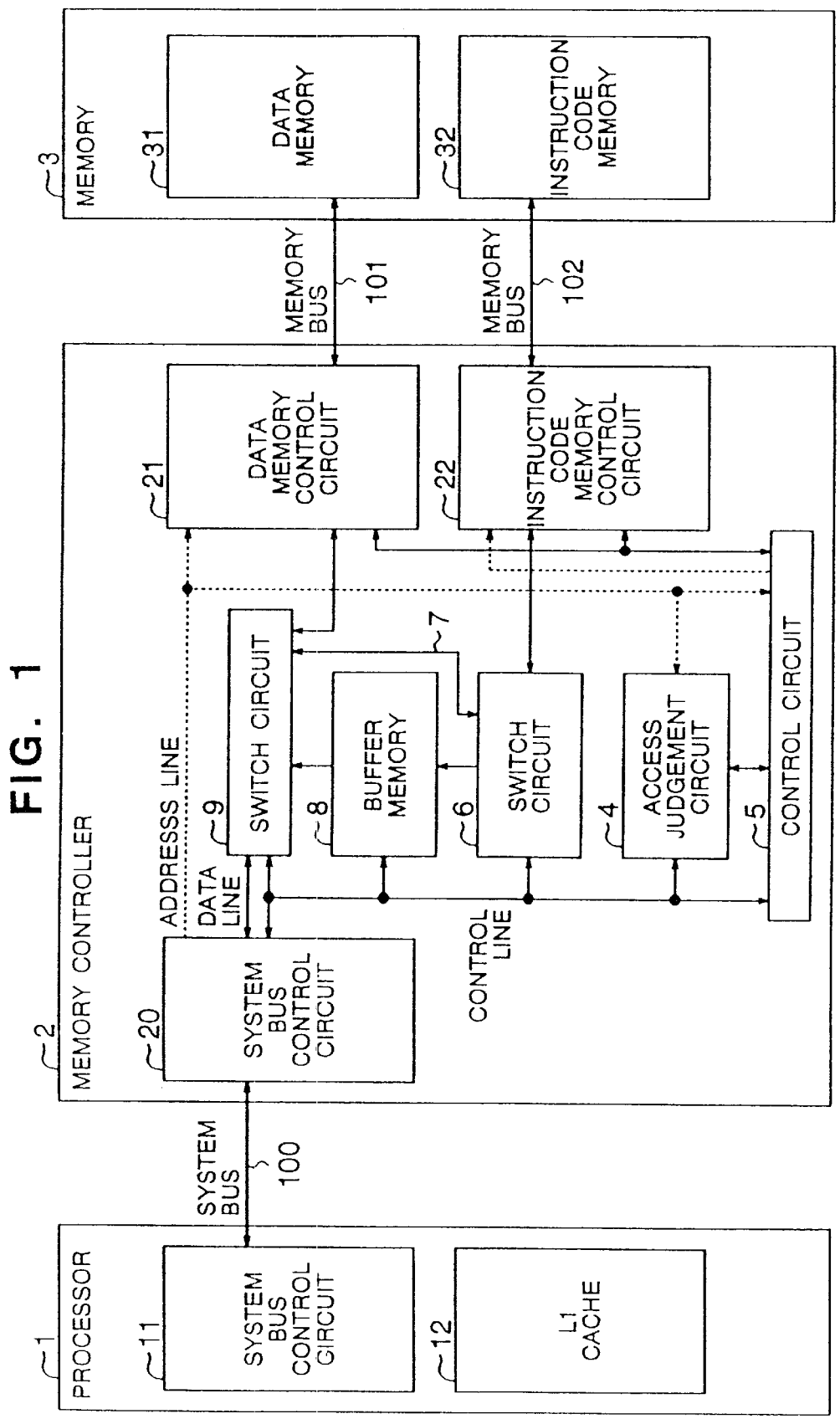
FIG. 1 is a schematic block diagram of a memory system in accordance with the present invention.

FIG. 1 is a general block diagram of an embodiment of the present invention. The present embodiment is an example wherein a memory 3 stores therein an instruction code to be executed on a processor 1 and data such as operands to perform a prefetching operation for an instruction code access.

A memory system illustrated in FIG. 1 is roughly divided into a processor 1, a memory controller 2 and a memory 3. The processor 1 includes at least a system bus control circuit 11 and an L1 (level 1) cache 12. The memory controller 2 controls data transfer between the processor 1 and memory 3. The memory controller 2 divides a memory space viewed from the processor 1 into an instruction code memory area and a data memory area for its management. The memory 3 has a memory 31 for data storage (referred to as the data memory 31, hereinafter) and a memory 32 for instruction code storage (referred to as the instruction code memory 32, hereinafter).

The processor 1 and memory controller 2 are connected by a system bus 100, and the memory controller 2 and memories 31, 32 are connected by memory buses 101 and 102 which are independent of each other. The memory controller 2 has a system bus control circuit 20, a data memory control circuit 21 and an instruction code memory control circuit 22, that function as input/output means to/from the processor 1 and memory 3. When the processor 1 accesses the memories 31, 32, first, the processor accesses the memory controller 2 via the system bus 100, then releases the system bus 100. Next, memory controller 2 accesses the memory 31 or 32 in accordance with address information designated by the processor 1. Further, the memory controller 2 can avoid a contention between the data memory access and instruction code memory access, and also can access the instruction code memory simultaneously with the data memory access.

The memory controller 2 will be described below in greater detail.

The memory controller 2 includes an access judgement circuit 4, a control circuit 5, switch circuits 6 and 9, a direct bus 7 and a buffer memory 8.

The access judgement circuit 4 analyzes an access from the processor 1, and divides a memory read access from the processor 1 into an instruction code access and a data access for discrimination. The access judgement circuit 4 also judges whether or not the data accessed by the processor 1 is present in the buffer memory 8 (the presence of the data accessed by the processor will be called the read-ahead hit or prefetch hit, hereinafter). Details of the access judgement circuit 4 will be explained in connection with FIG. 3.

The control circuit 5 performs control over the entire memory controller. More specifically, the control circuit 5 also performs read-ahead control from the instruction code memory 32, in addition to control over the switch circuits 6, 9, memory control circuits 21, 22, system bus control circuit 20, etc. Details of the control circuit 5 will be explained in connection with FIGS. 4, 8 and 9.

The switch circuit 6 switches between the direct bus 7 and buffer memory 8. The switch circuit is an electrically switching means and can be implemented easily with a selector, a multiplexer or the like. The switch circuit 9 switches interconnections of data lines between the system bus control circuit 20 and the data memory control circuit 21 and instruction code memory control circuit 22. In this connection, when the interconnection between the system bus control circuit 20 and instruction code memory control circuit 22 is selected, the direct bus 7 or the buffer memory 8 can be selected.

The direct bus 7 is such a transmission path as to able to transmit the read data from the instruction code memory 32 directly to the system bus control circuit 20 without any intervention of the buffer memory 8, thus reducing its overhead time. A write access to the memory is carried out also using the direct bus 7.

The buffer memory 8 functions to temporarily store therein an instruction code prefetched from the instruction code memory 32. Since the prefetched instruction code is temporarily stored in the buffer memory 8, the access latency of the processor can be reduced and a fetch speed can be made faster at the time of the prefetch hit. Further, during transmission of the prefetch hit data to the processor, prefetch of the next data can be realized from the memory concurrently with it. This results in that a fetch overhead time can be made small or reduced apparently to zero. Explanation will be made in the following in connection with a case where a buffer memory is employed as a memory provided within the memory controller, but a cache memory may be used as the memory to store therein read-ahead data.

As mentioned above, the present embodiment is featured in that the instruction code memory 32 and data memory 31 are connected with the memory controller 2 via the independent memory buses 101 and 102 respectively, the instruction code access is separated by the memory controller 2 from the data access to, thereby realize the access judgement of the instruction code as well as the corresponding prefetch of the autonomous instruction code to the buffer memory 8 by the memory controller 2. At the time of a prefetch hit during the processor access, since the instruction code can be transmitted from the buffer memory, the fetch speed can be made faster. For this reason, since the need for using cache or a high-speed expensive memory as the memory 3 can be eliminated and instead an inexpensive general SRAM or DRAM can be employed to reduce an access latency, thus realizing a low-cost, high-performance memory system.

Figure 2:
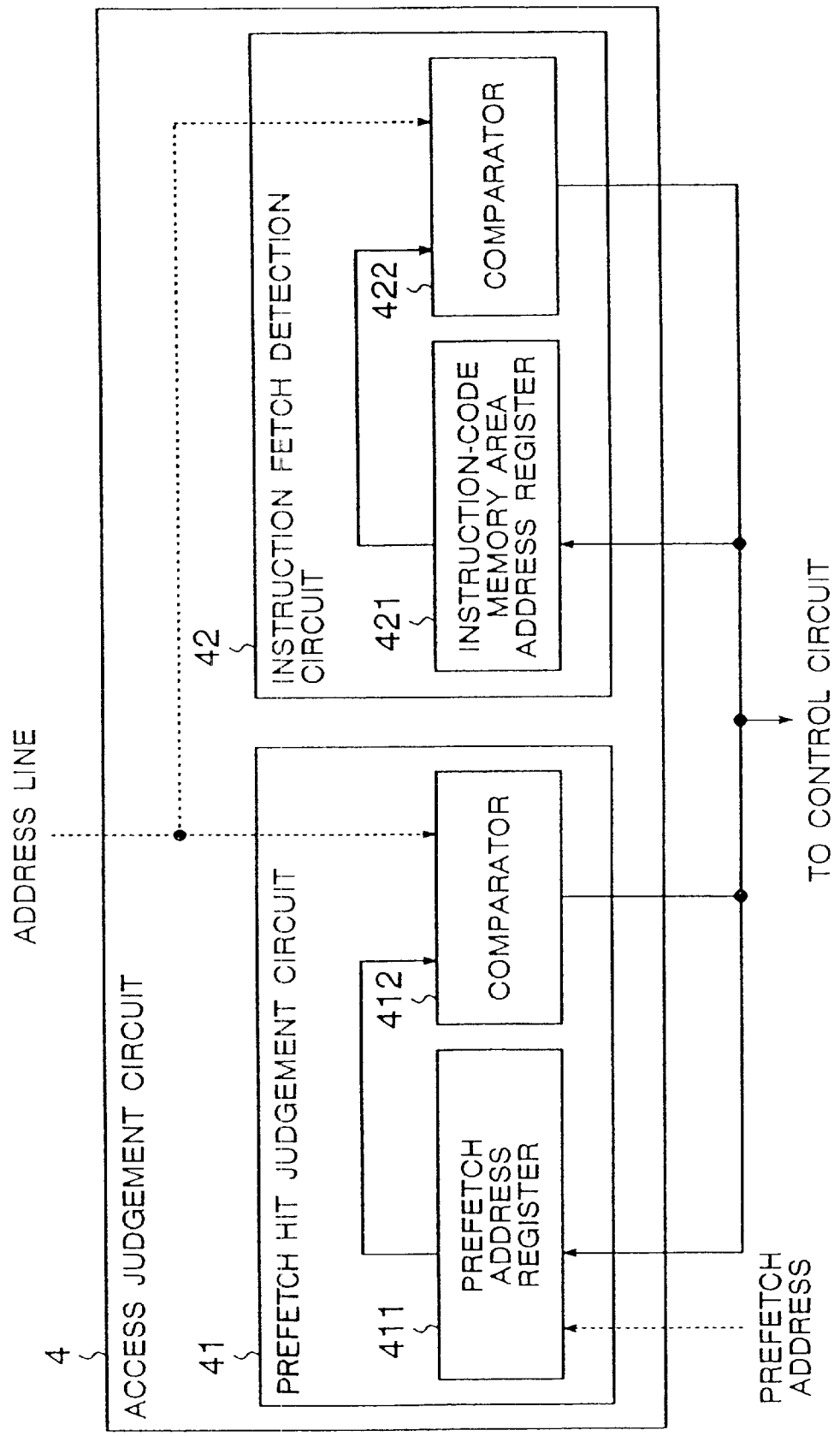
FIG. 2 is a block diagram of an example of an access judgement circuit in a memory controller of the memory system of the invention.

Explanation will next be made as to an implementation example of the access judgement circuit. FIG. 2 is a block diagram of an example of the access judgement circuit 4 in the memory controller 2 of FIG. 1 in the present invention. The access judgement circuit 4 has a prefetch hit judgement circuit 41 and an instruction fetch detection circuit 42. The prefetch hit judgement circuit 41 has a prefetch address register 411 for storing therein the address of the prefetched instruction code and a comparator 412 for comparing the address accessed by the processor with the address prefetched by the memory controller. When both addresses are identical, the prefetch hit judgement circuit 41 can judge it as a prefetch hit. The instruction fetch detection circuit 42 has an instruction-code memory area address register 421 for storing therein an upper address indicative of the instruction code memory area and a comparator 422 for comparing the upper address of the instruction-code memory area address register 421 with the address accessed by the processor.

Though not illustrated, the access judgement circuit further includes an access read/write judgement circuit. When a coincidence is found in the comparison and the access is of a read type, the judgement circuit can determine it as an instruction code fetch. For example, in the case where the instruction code memory area is from 100 00000H to 10FF FFFFH, 10H as upper 8 bits of the upper address is previously set in the instruction-code memory area address register 421, an access to the instruction code area can be detected from the comparison result of the upper 8 bits of the address accessed by the processor. The setting of the instruction-code memory area address register 421 is required only once at the time of the initialization setting.

As mentioned above, the present embodiment is featured in that detection of the instruction code fetch is carried out by judging whether or not the access address of the processor is placed in the instruction code memory area, the detection of the fetch access of the instruction code and the prefetch hit judgement are carried out at the same time, whereby access judging operation can be realized with a small overhead time.

Figure 3:
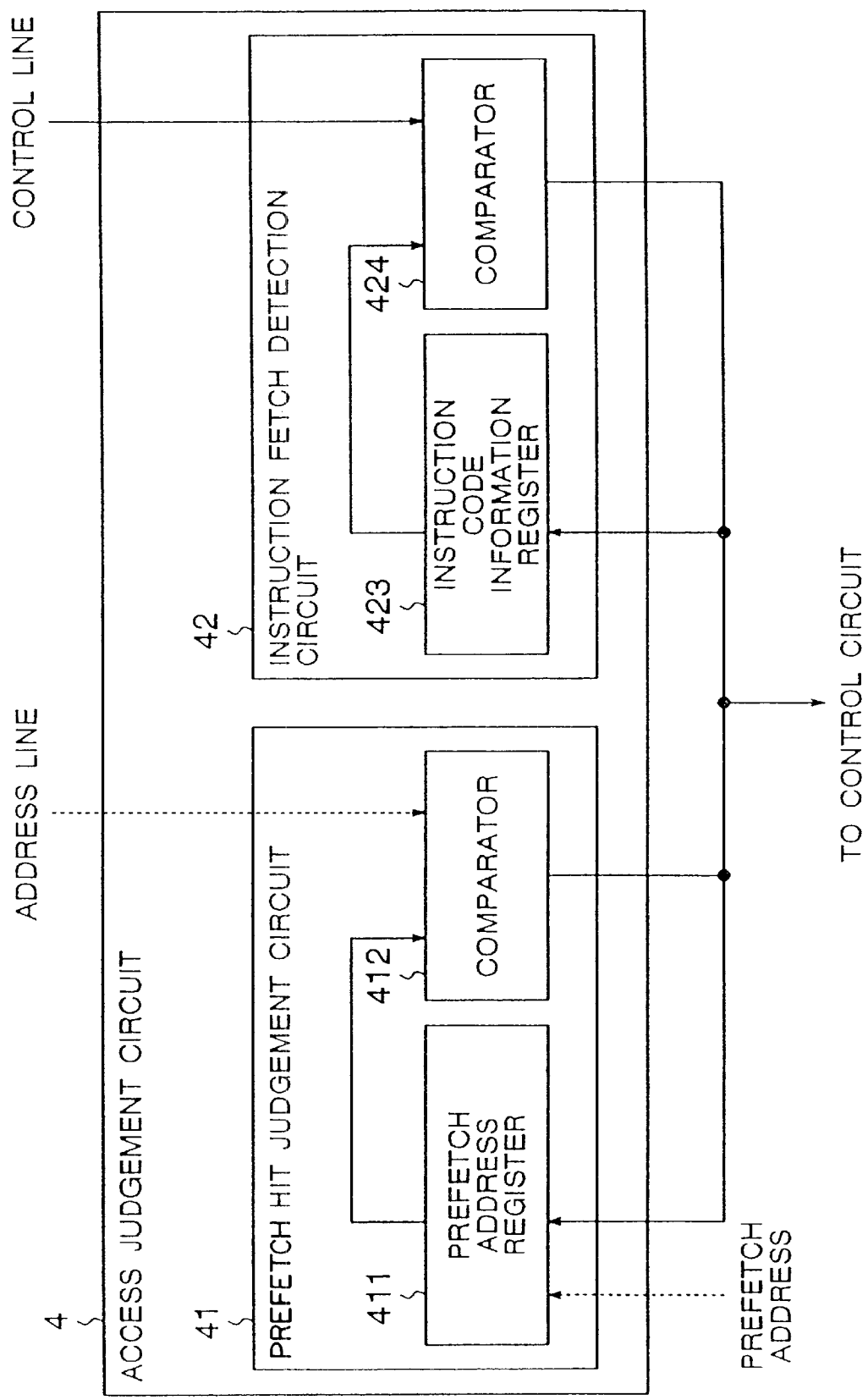
FIG. 3 is a block diagram of another example of the access judgement circuit within the memory controller.

FIG. 3 is a block diagram of another example of the access judgement circuit 4 in the present invention. Some processors can provide such a system bus control signal that contains a transfer attribute signal indicative of access information. In this case, by monitoring the transfer attribute signal, the fetch access of the instruction code can be detected. This example is featured in that the transfer attribute signal on the system bus is used to detect the instruction code fetch, the detection of the instruction code fetch access and the judgement of the prefetch hit are carried out at the same time, whereby access judging operation can be realized with a small overhead time.

Figure 4:
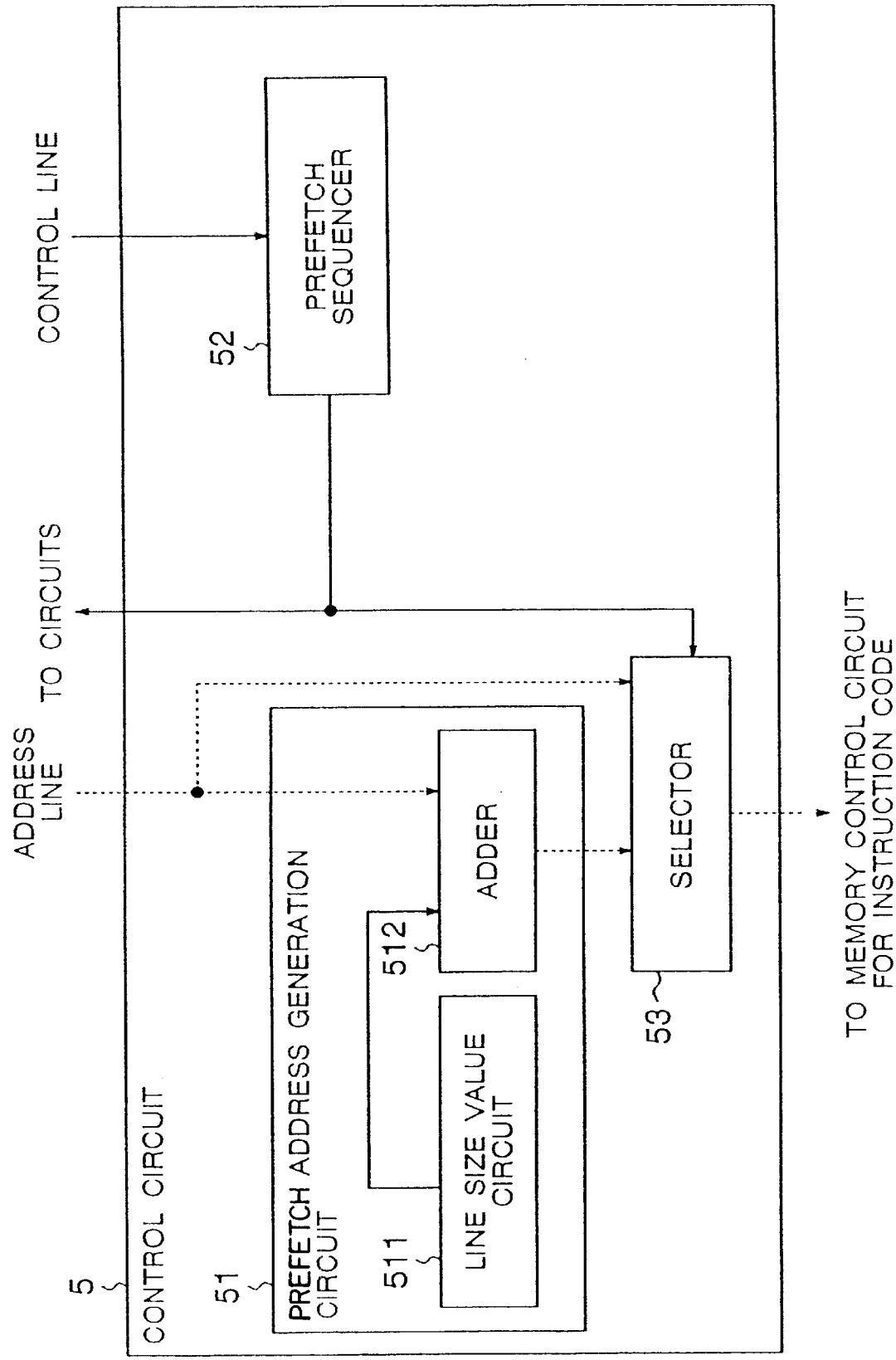
FIG. 4 is a block diagram of an example of a control circuit within the memory controller in the memory system of the invention.

Explanation will then be made as to a control circuit for performing read-ahead control, transfer control over the processor, and control over the entire memory controller. FIG. 4 is a block diagram of an example of the control circuit 5 in the memory controller in the present invention of FIG. 1. The control circuit 5 includes a prefetch address generation circuit 51, a prefetch sequencer 52 and a selector 53.

The prefetch address generation circuit 51 generates a prefetch address on the basis of an address anticipated to be accessed next by the processor from a line size value circuit 511 (which line size value corresponds to the access size of one instruction code) and an adder 512. The processor usually has an L1 cache therein and memory access is carried out on each line size basis. In many cases, access is of a burst type which continuously carries out 4 cycles of data transfer. In this example, it is assumed that the access unit of the processor is the line size of the level-1 cache, and an address to be next accessed is calculated by adding the line size to the accessed address.

The subject matter of this method is to calculate an address to be accessed next, and thus not to restrict the access size to the line size of the level-1 cache. Further, the line size value 511 may be a fixed value or a variable value by a register. The prefetch sequencer 52, on the basis of information received from the system bus control line or access judgement circuit 4, executes a memory access and a prefetch from the memory according to the access of the processor. Furthermore, the provision of the selector 53 enables change-over of the access destination address as an instruction to the instruction code memory control circuit 22, to a request address from the processor or to the generated prefetch address.

Figure 5:
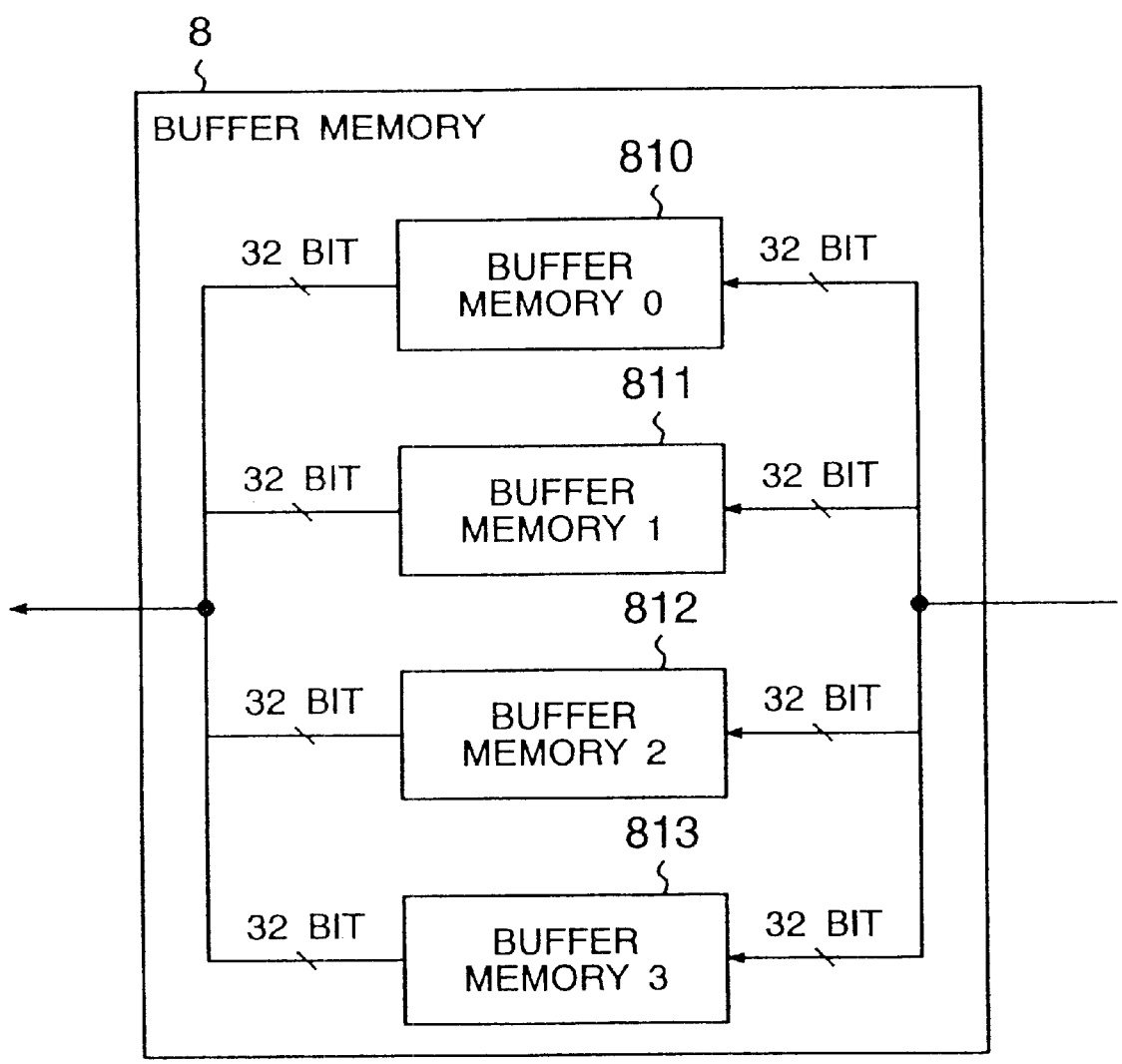
FIG. 5 is a block diagram of an example of a buffer memory in the memory controller of the invention.

Referring to FIG. 5, there is shown a block diagram of an example of the buffer memory 8 in the memory controller in the present invention. In some processors, it is impossible to read addresses sequentially from its smaller address in a burst read access of level-1 cache filling operation. This is because the most critical instruction code is read ahead. For example, when it is desired to read 32-bit data having continuous addresses 0, 1, 2 and 3, the data may not be read in the address ascending order of 0, 1, 2 and 3 but may be read in an address order of 2, 3, 0 and 1. In order to solve such an access problem, in the present example, the buffer memory 8 is made up of a plurality of buffer memories having a width equal to the access size of the processor. More specifically, in the example, an instruction code is assumed to consist of 32 bits, 4 channels of buffer memories 0 to 3 each having a 32-bit width are provided so that data are stored in the buffer memories sequentially from the buffer memory 0 at the time of reading from a memory, whereas, data transfer is carried out in an order requested by the processor in the processor transfer mode. As a result, the present invention can flexibly be compatible with any processor access system.

Figure 6:
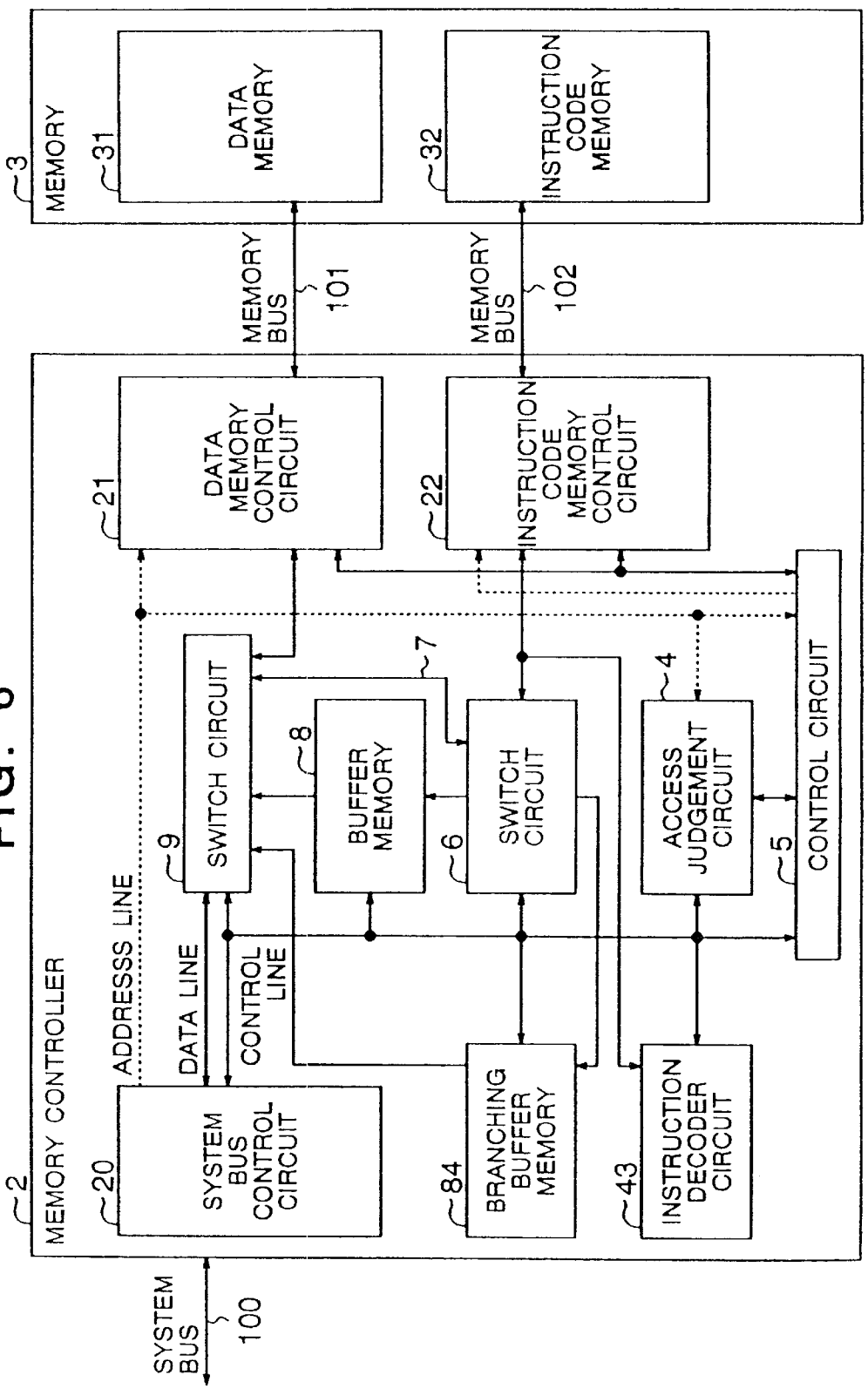
FIG. 6 is a block diagram of another example of the memory controller in the memory system of the invention.

FIG. 6 is a block diagram of another embodiment of the memory controller in the present invention. The present embodiment is featured in that the memory controller 2 newly includes an instruction decoder circuit 43 for decoding and analyzing an instruction code transferred from the instruction code memory 32 to the memory controller 2 and also includes a branching buffer memory 84. The instruction decoder circuit 43 detects presence or absence of a branch instruction such as branch or jump in the transferred instruction code. The control circuit 5, when the instruction decoder circuit 43 detects a branch instruction, reads ahead an instruction code at the branch destination into the branching buffer memory 84. The access judgement circuit 4, in the presence of an instruction code access from the processor, judges whether or not it is found in the normal read-ahead buffer memory 8 or in the branching buffer memory 84. In the case of a hit, the control circuit 5 transfers the instruction code from the hit buffer memory to the processor. As a result, even when a branch takes place in the processor, performance deterioration caused by stall can be improved.

Figure 7:
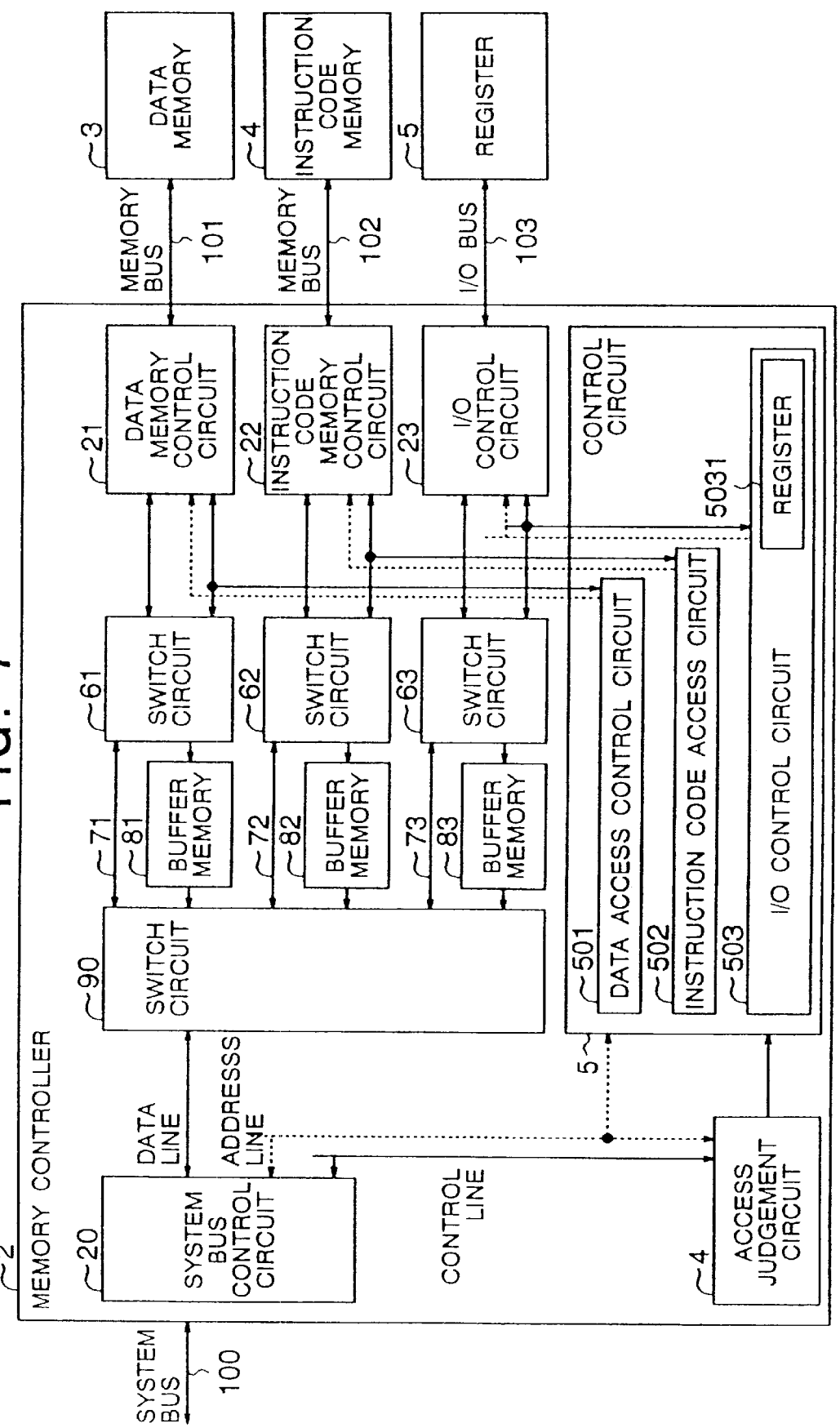
FIG. 7 is a block diagram of a further example of the memory controller in controller in the memory system of the invention.

FIG. 7 is a block diagram of another embodiment of the memory controller in the present invention. The present embodiment is featured in that a buffer memory and a control circuit are provided not only for the instruction code area but also for the data memory area and register area, individually.

An access from the processor is divided by the switch circuit 90 into accesses to the instruction code area, data area and register areas. The access judgement circuit 4 judges a hit in each buffer memory. The access judgement circuit 4 can be easily implemented in substantially the same manner as in the embodiment of FIGS. 3 and 4. The control circuit 5 has a data access control circuit 501, an instruction code access circuit 502 and an I/O control circuit 503. Each control circuit has a sequencer for prefetch control to implement a prefetch for each area. Further, even switch circuits 61, 62, 63, direct paths 71, 72, 73 and buffer memories 81, 82, 83 are provided for each area.

As has been mentioned above, in the memory controller of the present embodiment, accesses to the instruction code memory, data memory and register are separated for the respective areas and the buffer memory and control circuit are provided for each area. Therefore, when a sequential read access is generated for each area, read-ahead can be done for each buffer memory and thus data or register access latency can be reduced. Further, with respect to an access to another system via an I/O bus 103, the present embodiment can exhibit a similar effect to the above even by utilizing the read-ahead. Furthermore, there is such a case as to wish to directly read the register value at the time of the processor access. In order to satisfy the above demand, the I/O control circuit 503 has a register 5031 for start and stop instruction of the read-ahead. For example, it is only required to perform the read-ahead operation when "1" is set in the register and not to perform the read-ahead but to read the value of the register directly therefrom when "0" is set therein.

Figure 8:
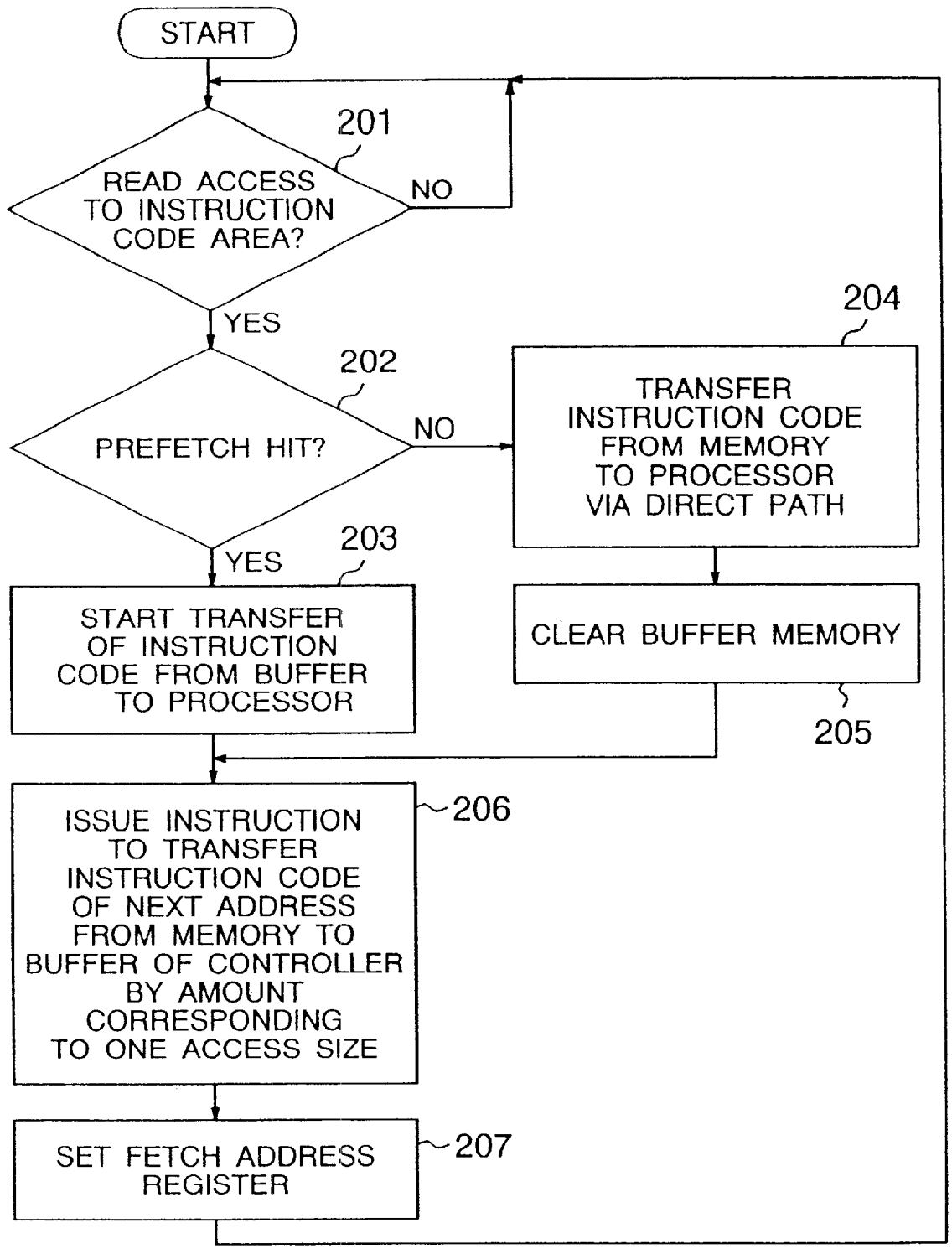
FIG. 8 is a flowchart showing an example of operation of a prefetch sequencer within the memory controller of the invention.

Next, explanation will be made as to the operation of the prefetch sequencer 52 by referring to FIGS. 8 and 9. FIG. 8 shows a flowchart of an exemplary operation of the prefetch sequencer 52 in FIG. 4. This exemplary flowchart shows when data corresponding to one access size is prefetched from an address following the current access for preparation of the next access at the time of occurrence of the access to the instruction code area.

When a processor access takes place, the prefetch sequencer 52 first judges whether or not this access is a read access to the instruction code area (step 201). The judgement is implemented, e.g., by means of address comparison, and its comparison circuit is implemented with the access judgement circuit 4. In the case of the read access to the instruction code area, the sequencer judges whether or not prefetch hit (step 202). Even for this judgement, a judgement result of the access judgement circuit 4 is used. In the case of a hit, the sequencer starts data transfer from the buffer within the memory controller to the processor (step 203). In the case of no hit, the sequencer performs the data transfer from the memory to the processor via the direct path (step 204). Further, since the data within the prefetch buffer is not a prefetch hit data, the prefetch buffer is cleared (step 205).

Following the steps 203 and 205, the sequencer instructs to transfer the data of the next address, i.e., an instruction code corresponding to the next access size from the memory to the buffer within the controller for preparation of the next access (step 206). Further, the sequencer sets in the fetch address register of the access judgement circuit an address of the instruction code memory prefetched in the buffer memory (step 207). At the time of occurrence of a processor access, the sequencer executes at least the aforementioned steps. As has been mentioned above, this example is featured in that, a fetch access takes place to the instruction code area of the processor, an instruction code estimated to be accessed next is fetched by an amount corresponding to one access size. As a result, read-ahead in the memory controller can be realized with a small buffer memory capacity.

Figure 9:
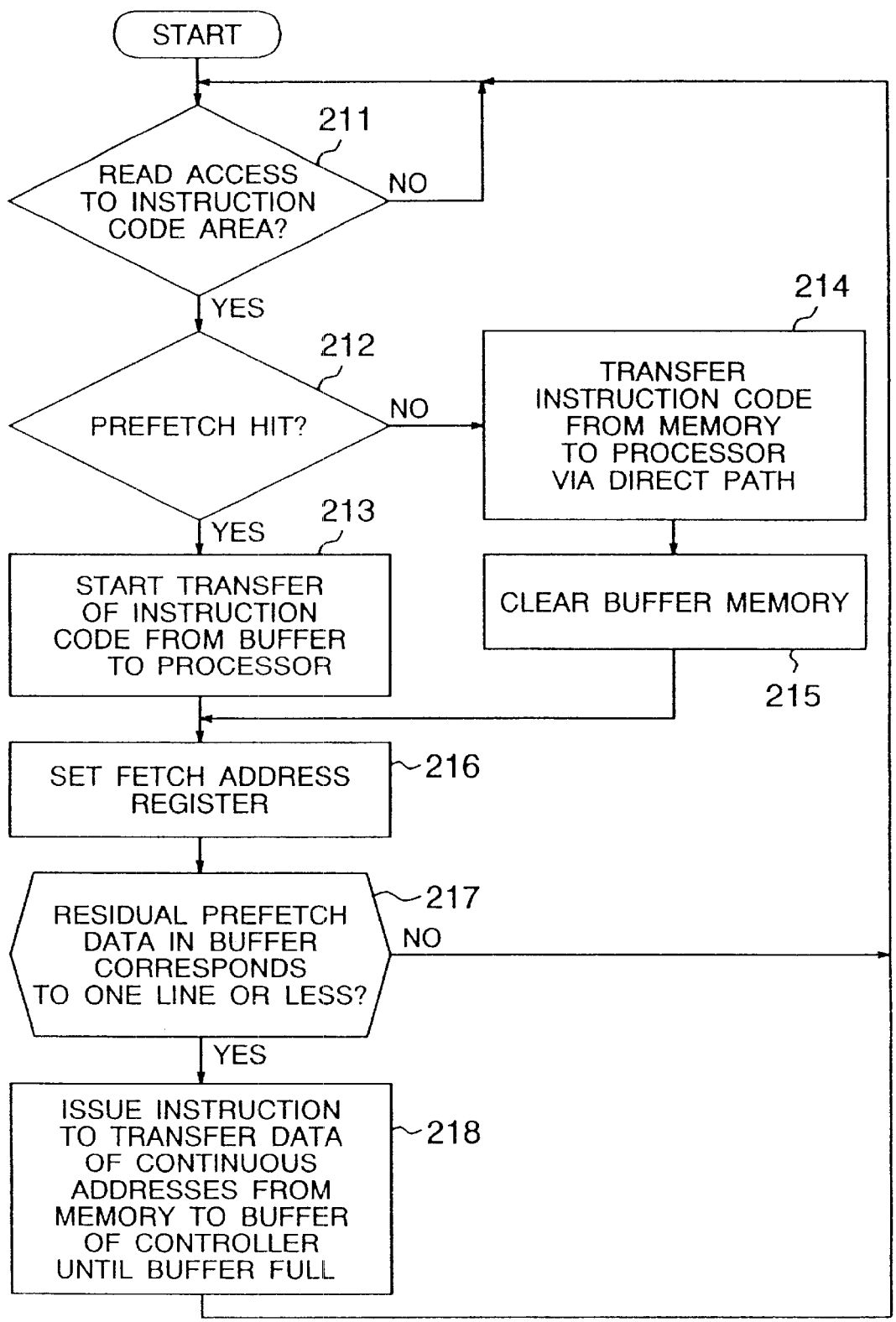
FIG. 9 is a flowchart showing another example of operation of the prefetch sequencer within the memory controller of the invention.

FIG. 9 is a flowchart of another exemplary operation of the prefetch sequencer 52 in FIG. 4. Steps 211 to 215 are the same as those in the flowchart of FIG. 8. After starting the transfer to the processor, the prefetch sequencer 52 sets the next fetch address register (step 216), and then judges whether or not the prefetch data capacity of the buffer corresponds to one access size or less (step 217). The method for identifying the remaining buffer capacity can be easily implemented, for example, by using an up/down counter to manage the data capacity of the buffer already stored therein. When there is a sufficient fetch data in the buffer, further read-ahead is not carried out. When the prefetch data amount of the buffer corresponds to one access size or less, on the other hand, the sequencer fetches data of the continuous addresses from the memory to the buffer of the controller until the buffer reaches its full storage capacity (step 218).

This embodiment is featured in that continuous instruction codes estimated to be accessed next are fetched until the buffer becomes full of the codes to reach its full storage capacity (buffer full). In this conjunction, it is desirable to set the buffer capacity to be an integer multiple of the access size. As a result, since the transfer between the memory and the buffer memory of the memory controller can be carried out with a relatively long burst size at a time, the need for performing the read-ahead operation for each instruction code access from the processor can be eliminated and control can be facilitated.

Figure 10:
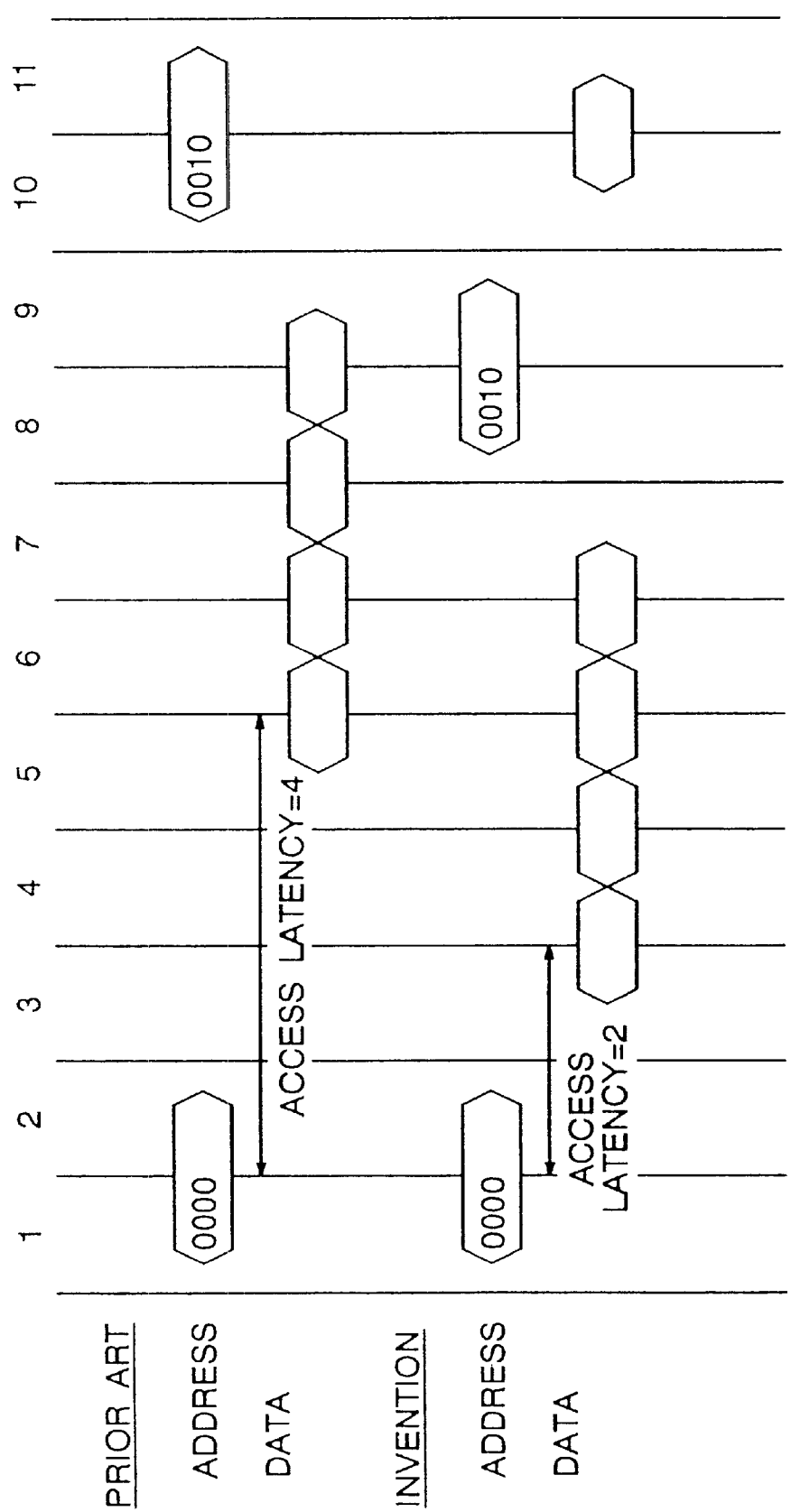
FIG. 10 is a timing chart showing an example of memory access in the invention.

FIG. 10 is a timing chart showing an exemplary memory access in the present invention. In this example, the prefetch effect at the time of the memory access will be explained by comparing it with that of the prior art. It is assumed herein as an example that the processor reads an instruction code through two burst read accesses for each cache line size on the basis of continuous addresses of from 0000 to 001F. Four words of '0000' in the first access and 4 words of '0010' are burst-read respectively in 4 cycles.

In the prior art method, when it is desired for the processor to read the instruction code from the address '0000', since the processor reads it directly from the memory at the time of occurrence of a processor access, the access time of the memory controller or memory access cannot be shorten. It is assumed herein that an access latency is 4. Even for the reading of the instruction code from the address of '0010' as the subsequent second access, the access latency becomes always 4.

Meanwhile, in the present invention, at the time of occurrence of the processor access, the access latency is 4 as in the prior art for the reading of the instruction code from the address of '0000', because the processor reads the instruction code directly from the memory. However, in the access with the address of '0000', the processor prefetches the address of '0010' following the first-mentioned address. Thus only the transfer time from the buffer memory of the memory controller becomes unnegligible and the access latency is 2, thus realizing a high-speed operation. An embedding program tends to sequentially or continuously execute an instruction code, which is useful in the present invention.

Figure 11:
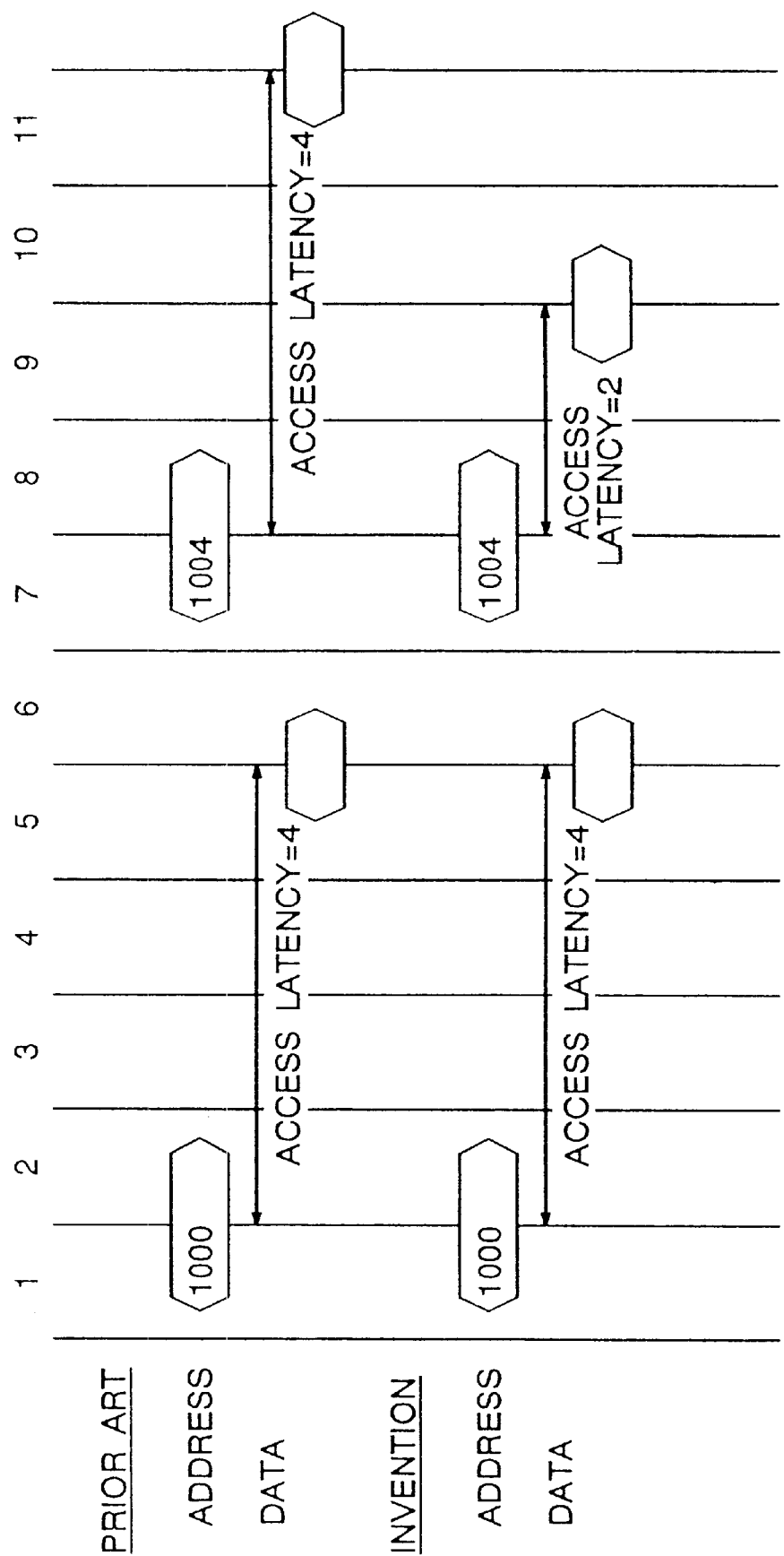
FIG. 11 is a timing chart showing an example of register access in the invention.

FIG. 11 is a timing chart showing an exemplary register access in the present invention. In this example, the prefetch effect at the time of the register access will be explained by comparing it with that of the prior art method. Explanation will be made as an example in connection with a case where, for two continual addresses of '1000' and '1004', the processor performs a sequential read access.

In the prior art method, when it is desired for the processor to read register data of an address '1000', since the processor reads it directly from the register at the time of occurrence of the processor access, the access time of the memory controller or register cannot be avoided. It is assumed herein that an access latency is 4. Even for the reading of the register data from the subsequent address of '1004', the access latency is 4. In this way, since the processor performs sequential access from the register, the access latency becomes always 4.

In the present invention, on the other hand, when a processor access takes place, the reading of register data of the address '1000' is carried out directly from the register so that the access latency becomes 4 as in the prior art. However, the address '1004' subsequent to the address '1000' is prefetched at the time of the access of the address '1000'. Thus for the reading of the register data of the address '1004', only the transfer time from the buffer memory of the memory controller becomes unnegligible and thus the access latency becomes 2, realizing a high-speed operation. Some program may read a plurality of continuous registers at a certain time, in which case the present invention is effective.

Figure 12:
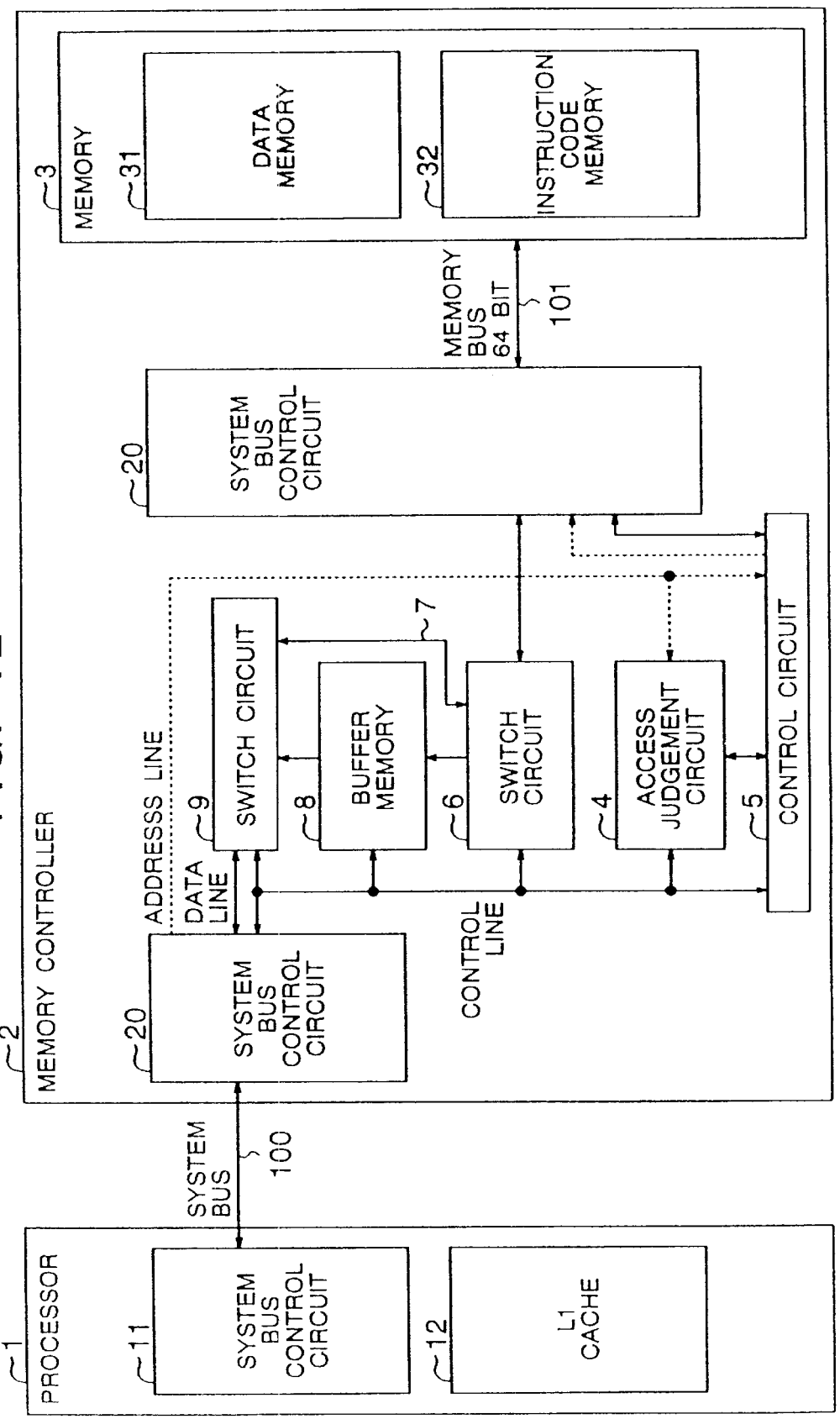
FIG. 12 is a block diagram of yet another example of the memory controller of the invention.
Figure 13:
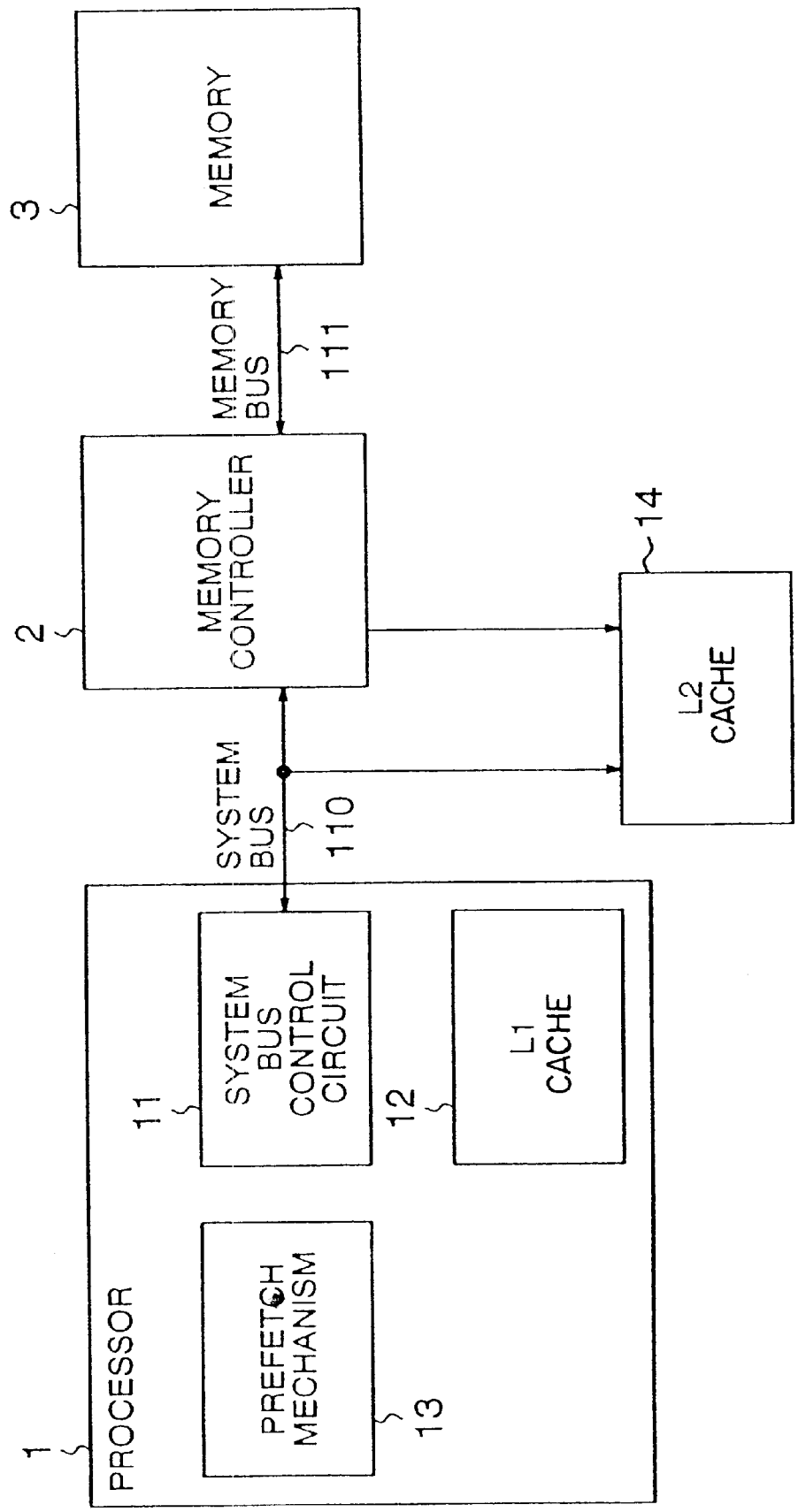
FIG. 13 is a block diagram of a prior art memory system.

FIG. 12 is a block diagram of an embodiment when the memory controller and the memory are mounted in an identical chip. The present embodiment is featured in that the bus width of the memory bus in the memory controller is set to be twice the bus width of the system bus, whereby a data transfer amount is increased as remarkably high as twice. More in detail, the system bus of the processor is assumed to be of a 32 bit type, a memory 3 is provided within a memory controller 2, and a memory control circuit 20 is connected with the memory 3 via a 64-bit memory bus 101. The memory bus 101 has a transfer performance of twice higher than that of a system bus 100, such that, at the time of a read access from the processor, the read-ahead transfer from the memory to the buffer memory can be concurrently completed in a transfer processing time to the processor. As a result, since the read-ahead access will not hinder the other memory access, the need for providing the instruction code memory and the data memory separately and providing the memory bus for each of the memories can be eliminated.

Although the above explanation has been made in connection with the case of increasing the bus width as a method for enhancing the transfer performance in the present embodiment, another method for increasing an operational frequency or combining the bus width increasing method and the operational-frequency increasing method may be employed, so long as the method can secure the transfer performance with the similar effect to the above. When the capacity of the memory provided in the same chip as the memory controller is small, it is desirable for the memory provided in the same chip to be allocated to an area having a strong random access tendency. For example, when the instruction code access has a strong sequential access tendency, it is preferable that the data memory be preferentially allocated to the memory provided within the same chip. The prefetch function of the memory controller enables instruction code access to be carried out at high speed, and the high-speed memory provided within the same chip enables the data access and random access to be carried out both at high speed.

As has been explained above, in accordance with the present invention, the memory controller is autonomously operated according to access types, and prior to a processor access, data is previously placed from the memory into the buffer within the memory controller. As a result, at the time of the processor access, the data can be transferred from the memory of the memory controller to the processor, thus reducing a data transfer time from the memory to the memory controller and also suppressing processor stall. Further, since use of general-purpose SRAM or DRAM enable reduction of the access latency, a low-cost, high-performance memory system can be realized. The memory system is valid, in particular, when data having a data size of twice or more the access unit of the processor is prefetched into the buffer of the memory controller.

When the buffer memory for storage of read-ahead data, the register for holding therein the address of the read-ahead data to be stored in the buffer memory and the circuit having the comparator for judging access types are provided in the memory controller, read-ahead hit judgement becomes possible. Further, since the switch circuit is provided in the memory controller and accesses to the instruction code, data and register areas having different access types are separated and treated differently; the access type judgement and read-ahead control can be easily realized. Furthermore, since the direct path for direct data transfer between the processor and memory without any intervention of the buffer memory is provided, at the time of a read-ahead error, the system can quickly respond to it without any intervention of the buffer memory.

Since the instruction code memory is provided as separated from the data memory and the memory bus and its control circuit are provided for each of the memories, a contention on the memory bus between the instruction code read-ahead and data access can be avoided.

The read-ahead to the memory controller is carried out at the time of a processor access so that, at the time of a read-ahead hit, the data of the buffer memory is transferred to the processor and at the same time, an address to be next accessed by the processor is estimated to perform the read-ahead operation from the buffer to the buffer memory. At the time of a read-ahead error, the data is transferred from the memory directly to the processor and at the same time, the data of the buffer memory is cleared, an address to be next accessed by the processor is estimated to perform the read-ahead operation from the memory to the buffer memory. As a result, at the time of a read-ahead error, the read-ahead access can be realized simultaneously with the access to the processor, whereby the system can cope with continuous access requests from the processor.

Further, with respect to the transfer from the buffer memory to the processor, by providing a plurality of buffer memories having a data width equal to the instruction code size, burst transfer from an address becomes possible.

When the instruction decoder circuit and the branching buffer memory are provided in the memory controller to perform read-ahead operation, at the time of detecting a branch instruction, over even an instruction code as its branch destination, thus enabling suppression of processor stall in the branch mode.

When the read-ahead mechanism is provided even for the data memory and register, accesses to continuous addresses of the data memory and register can be carried out at high speed.

Further, when a register for instructing a start or stop of the read-ahead is provided in the read-ahead control circuit, the use of the read-ahead mechanism can be selected.

At the time of starting the operation of the system, the read-ahead operation is started with such a pre-specified memory address as the header address of a program, so that the read-ahead function can be utilized from the start of the operation.

With respect to the read-ahead operation to the memory controller, in the processor access mode, data corresponding to one access size of the processor is transferred to the memory controller at the time of a read-ahead hit, while data corresponding to two access sizes of the processor access and subsequent address is transferred to the memory controller at the time of a read-ahead error to also perform the read-ahead operation with the single transfer. Thus the read-ahead function can be realized with a less capacity of buffer memory.

Further, the read-ahead operation to the memory controller is judged based on the amount of data already stored in the buffer memory and the read-ahead is carried out until the buffer capacity is full of data, thereby facilitating the read-ahead control.

Since the read-ahead size from the memory by the memory controller is set to be equal to the access size of the processor, the buffer capacity can be reduced, that is, circuit implementation can be facilitated.

When the read-ahead size from the memory is set to be the line size of the level-1 cache built in the processor, there can be realized an optimum memory system using the processor which the level-1 cache is built in.

Further, the memory controller and the memory are mounted on the same chip, the operational frequency of the bus between the processor and memory controller is set higher than that between the memory controller and memory, and read-ahead operation for the next access from the memory is carried out during transfer of the read-ahead data from the buffer memory to the processor. As a result, the transfer performance of the memory bus can be improved, and the occupied memory bus time in the read-ahead mode can be reduced. As another effect, the need for separating the memory bus into buses for the data and instruction code can be eliminated.

The memory controller and the memory are mounted on the same chip, the width of the bus between the memory controller and memory is set higher than that between the processor and memory controller, and read-ahead operation for the next access from the memory is carried out during the transfer of the read-ahead data from the buffer memory to the processor. As a result, the transfer performance of the memory bus can be improved, and the occupied memory bus time in the read-ahead mode can be reduced. As another effect, the need for separating the memory bus into buses for the data and instruction code can be eliminated.

Further, the memory mounted on the same chip is preferentially allocated as the data memory area, so that, even when the capacity of the memory mounted on the same chip is small, an optimum memory system can be realized.

What is claimed is:

1. An information processing system comprising:

a processor;

a memory; and a memory controller connected with said processor via a first bus and connected with said memory via a second bus for controlling said memory, wherein said memory controller comprises a buffer memory and a control circuit, and said control circuit is controlled, before a memory access is carried out from said processor, to estimate an address to be possibly accessed next on the basis of addresses previously accessed and to prefetch data stored in said memory into said buffer memory, in accordance with said estimated address wherein said data has a data size of twice or more an access unit of said processor, said memory controller further comprising a register to instruct start or stop of the prefetch of said data stored in said memory into said buffer memory, wherein said memory controller comprises a direct path for transmitting data directly to said processor from said memory therethrough; said control circuit, when the access from said processor hits data within said buffer memory, is controlled to transfer the data to said processor, whereas, said control circuit, when the access from said processor fails to hit data within said buffer memory, is controlled to transfer data within said memory to said processor via said direct path, wherein said control circuit is controlled, when the access from said processor fails to hit data within said buffer memory, to transfer data from said processor to said memory through said direct path and also to clear data within said buffer memory to perform read-ahead operation to said buffer memory.

2. An information processing system comprising:

a processor;

a memory; and a memory controller connected with said processor via a first bus and connected with said memory via a second bus for controlling said memory, wherein said memory controller comprises a buffer memory and a control circuit, and said control circuit is controlled, before a memory access is carried out from said processor, to estimate an address to be possibly accessed next on the basis of addresses previously accessed and to prefetch data stored in said memory into said buffer memory, in accordance with said estimated address wherein said data has a data size of twice or more an access unit of said processor, said memory controller further comprising a register to instruct start or stop of the prefetch of said data stored in said memory into said buffer memory, wherein said memory controller comprises a direct path for transmitting data directly to said processor from said memory therethrough; said control circuit, when the access from said processor hits data within said buffer memory, is controlled to transfer the data to said processor, whereas, said control circuit, when the access from said processor fails to hit data within said buffer memory, is controlled to transfer data within said memory to said processor via said direct path, wherein said control circuit is controlled, when the access from said processor hits said buffer memory and when a size of the data already stored in said buffer memory is equal to or smaller than said access unit, to prefetch the data into said buffer memory until the buffer memory becomes full of the data and, when the access from said processor fails to hit said buffer memory, to clear the data within said buffer memory to prefetch the new data until said buffer memory becomes full of the data.

* * * * *